UNITED STATES PATENT OFFICE.

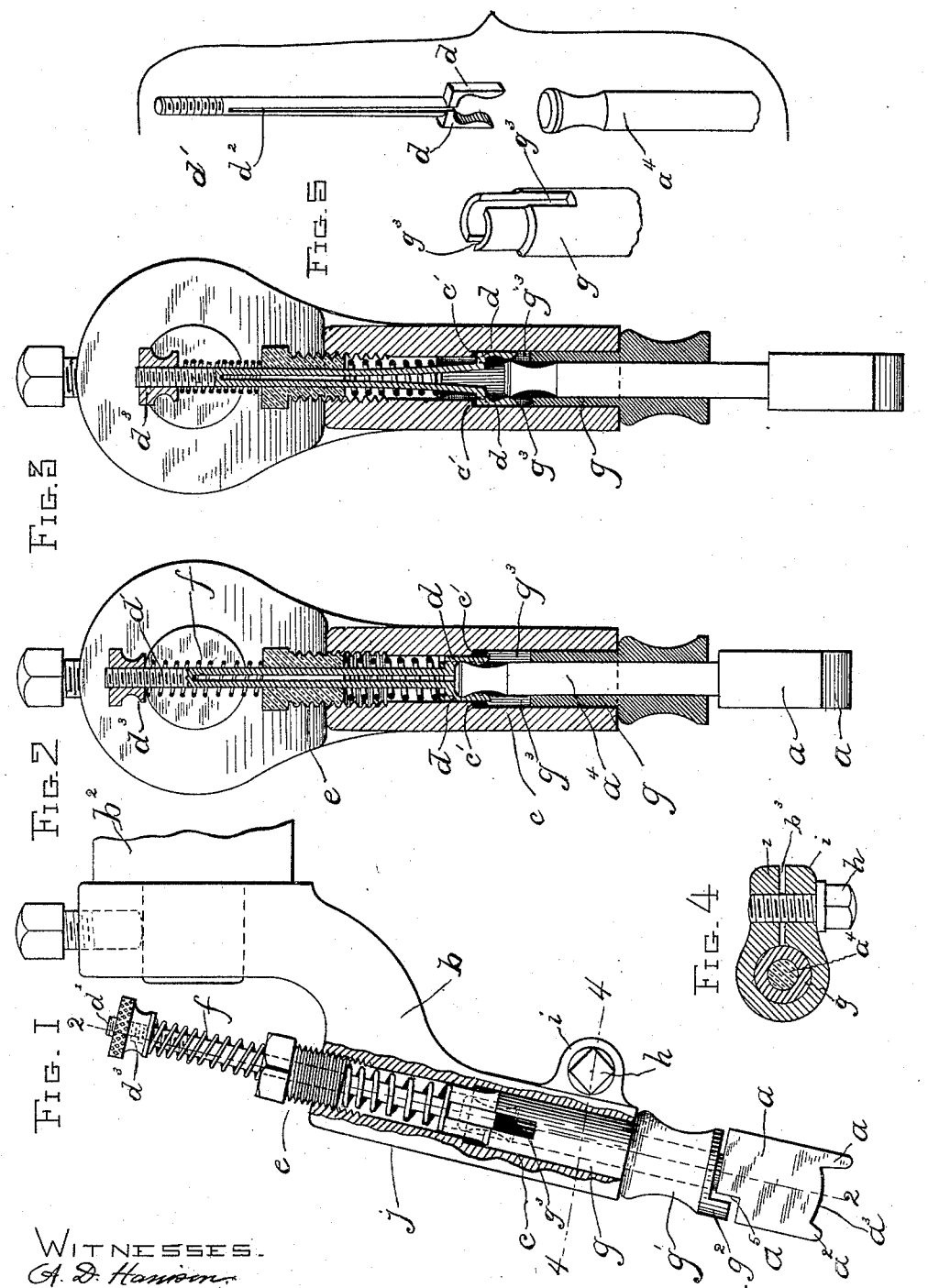

JOHN W. PLUMMER, OF SOMERVILLE, MASSACHUSETTS.

TOOL-HOLDER.

SPECIFICATION forming part of Letters Patent No. 474,302, dated May 3, 1892.

Application filed June 8, 1891. Serial No. 395,513. (No model.)

*To all whom it may concern:*

Be it known that I, JOHN W. PLUMMER, of Somerville, in the county of Middlesex and State of Massachusetts, have invented certain new and useful Improvements in Tool-Holders, of which the following is a specification.

This invention has for its object, chiefly, to provide means for securely engaging the shank of a sole or heel edge burnishing-tool with a reciprocating carrier that gives motion to said tool; and it consists in the improvements which I will now proceed to describe and claim.

Of the accompanying drawings, forming a part of this specification, Figure 1 represents a side elevation of an oscillating tool-carrying arm provided with my improved tool engaging and releasing devices, said arm being shown as partly broken away. Fig. 2 represents a section on line 2 2 of Fig. 1. Fig. 3 represents a similar section showing the tool released. Fig. 4 represents a section on line 4 4 of Fig. 1. Fig. 5 represents a perspective view of parts of the device.

The same letters of reference indicate the same parts in all the figures.

In the drawings, $a$ represents a tool which is here shown as formed to burnish the edge of a boot or shoe sole, said tool having the usual lip or guard $a'$, formed to bear on the tread-surface of the sole, the rand-lip $a^2$, formed to enter the rand-crease between the sole and upper, and an intermediate acting-face $a^3$, which acts on the edge of the sole. It will be understood, however, that my invention is not limited to use in connection with a tool of the form here shown, nor to a burnishing-tool, as it may be used in connection with any tool which is oscillated or reciprocated by a carrier from which it is desired to make the tool readily detachable.

$b$ represents the tool-carrier, which is here shown as an arm affixed to a shaft $b^2$, which is adapted to rock in suitable bearings, said shaft by its rocking movement imparting an oscillating movement to the carrier $b$ and tool $a$.

The carrier $b$ is provided with a longitudinal socket $c$, which receives the shank $a^4$ of the tool $a$, and a pair of locking-jaws $d\ d$, which grasp the upper end of said shank, as presently described. Said jaws are formed on a split rod or shank $d'$, said rod being divided by a slot $d^2$ from its lower end, on which said jaws are formed, to a point near its upper end, the latter being left solid, this construction enabling the jaws to move toward and from each other. The shank or rod $d$ is fitted to slide longitudinally in a screw-plug $e$, which is screwed into the upper end of the socket $c$. Said socket is made larger at its lower portion than at its upper portion, the enlarged lower portion terminating in a shoulder $c'$, as shown in Figs. 2 and 3. The contracted upper portion of the socket is of such diameter that it holds the jaws $d\ d$ in engagement with the upper end of the tool-shank $a^4$, as shown in Fig. 2, by preventing said jaws from swinging outwardly far enough to release their hold on said shank. The enlarged lower portion of the socket $c$ is, however, of such diameter that when the rod $d'$ and jaws $d\ d$ are pressed downwardly, so that the jaws are below the shoulder $c'$, as shown in Fig. 3, the jaws can separate far enough to permit the shank $a^4$ to be withdrawn from between them, said shank being shown in Fig. 3 as being moved downwardly to withdraw it from between the jaws.

The rod $d'$ and the jaws $d\ d$ thereon are normally held in the position shown in Figs. 1 and 2 to keep the jaws in engagement with the tool-shank by means of a spring $f$, which bears at one end upon the plug $e$ and at its other end on a nut or collar $d^3$ upon the rod $d'$, the tendency of said spring being to elevate the rod and jaws and hold them in the position shown in Figs. 1 and 2.

When it is desired to remove the tool $a$, the operator by pressing downwardly upon the rod $d'$ forces the jaws $d\ d$ into the larger lower portion of the socket $c$, as shown in Fig. 3, so that the tool may be readily pulled out of the socket. In inserting the tool the jaws are depressed as last described and the shank of the tool is inserted between them, after which the rod $d'$ is released and forced upwardly by the spring $f$, which causes the jaws to firmly hold the shank $a^4$, the latter being moved upwardly with the jaws.

It will be seen that the described devices enable the tool to be securely engaged with its carrier and at the same time quickly and easily inserted and removed.

I have here shown a sleeve $g$ inserted in the lower portion of the socket $c$, said sleeve having a central socket or orifice, through which the tool-shank $a^4$ passes. On the lower end of the sleeve $g$ is an enlargement $g'$, one side of which is provided with a downwardly-projecting lip $g^2$, which constitutes a stop to prevent the free rotation of the tool $a$, said stop being slightly separated from a recessed face $a^5$ on the tool $a$, as shown in Fig. 1, so that the tool can have a limited rocking movement, such as the burnishing-tool of a sole-edge-burnishing machine usually has without turning too loosely or to too great an extent.

The lower portion of the carrier $b$ is split, as shown at $b^3$, Fig. 4, so that it may be clamped upon the sleeve $g$ by means of a set-screw $h$ passing through ears $i$ $i$, formed on the carrier at opposite sides of the split $b^3$. By tightening said set-screw the split portion of the carrier is firmly clamped upon and caused to rigidly hold the sleeve $g$, while by loosening said screw the sleeve is released and may be removed or adjusted vertically.

$j$ represents a spring in the upper portion of the socket $c$, said spring bearing at its upper end against the plug $e$ and at its lower end against the upper end of the sleeve $g$, the object of said spring being to force said sleeve downwardly when the screw $h$ is loosened, thus giving the burnishing-tool a yielding pressure on the work whenever such pressure is desired. It will be seen that when the sleeve $g$ is rigidly clamped by the screw $h$ the spring $j$ is inoperative; but when said screw is loosened the said spring exerts a downward pressure on the sleeve $g$ and through the latter on the tool $a$.

The upper portion of the sleeve $g$ is provided with slots $g^3$ $g^3$ to receive the jaws $d$ $d$, said slots being of sufficient length to permit the described depression of said jaws.

I claim—

1. The combination of a tool-carrier provided with a longitudinal socket having an enlarged portion and a contracted portion, a rod fitted to slide in said socket and provided with a pair of tool-grasping jaws, a spring arranged to normally hold said jaws in the contracted portion of the socket, a sleeve located in said socket and projecting below the same, said sleeve having at its lower end a stop $g^2$ to limit the turning movement of the tool, and means for securing the sleeve rigidly to the carrier, as set forth.

2. The combination of a tool-carrier provided with a longitudinal socket having an enlarged portion and a contracted portion, a rod fitted to slide in said socket and provided with a pair of tool-grasping jaws, a spring arranged to normally hold said jaws in the contracted portion of the socket, a sleeve located in said socket and projecting below the same, said sleeve having at its lower end a stop $g^2$ to limit the turning movement of the tool, and a spring arranged to exert a downward yielding pressure on the sleeve, as set forth.

In testimony whereof I have signed my name to this specification, in the presence of two subscribing witnesses, this 2d day of June, A. D. 1891.

JOHN W. PLUMMER.

Witnesses:
C. F. BROWN,
A. D. HARRISON.